(12) United States Patent
Wiggins et al.

(10) Patent No.: US 7,441,647 B2
(45) Date of Patent: Oct. 28, 2008

(54) TENSIONING ASSEMBLY FOR CONVEYING BELT CLEANING BLADE

(75) Inventors: Daniel G. Wiggins, Marquette, MI (US);
Robert J. Airaudi, Isheming, MI (US);
Robert L. Welker, III, Marquette, MI (US); Alan J. Henderson, Marquette, MI (US); Jeremy R. Nylund, Marquette, MI (US); Gregory W. Cappaert, Marquette, MI (US)

(73) Assignee: Argonics, Inc., Marquette, MI (US)

( * ) Notice: Subject to any disclaimer, the term of this patent is extended or adjusted under 35 U.S.C. 154(b) by 81 days.

(21) Appl. No.: 11/068,685

(22) Filed: Feb. 28, 2005

(65) Prior Publication Data
US 2006/0191772 A1 Aug. 31, 2006

(51) Int. Cl.
*B65G 45/00* (2006.01)
*B65G 45/12* (2006.01)
*B65G 45/16* (2006.01)

(52) U.S. Cl. ............... 198/499; 198/494; 198/497
(58) Field of Classification Search ............. 198/499, 198/494, 497; 474/109, 111
See application file for complete search history.

(56) References Cited
U.S. PATENT DOCUMENTS

| | | | |
|---|---|---|---|
| 4,098,394 A | 7/1978 | Stahura | |
| 4,925,434 A | 5/1990 | Swinderman et al. | |
| 4,969,553 A * | 11/1990 | Stoll | 198/499 |
| 5,088,965 A | 2/1992 | Swinderman et al. | |
| 5,301,797 A | 4/1994 | Hollyfield, Jr. et al. | |
| 5,378,202 A | 1/1995 | Swinderman | |
| 5,385,507 A | 1/1995 | Swearingen et al. | |
| 5,950,803 A * | 9/1999 | Schwarze | 198/499 |
| 5,992,614 A * | 11/1999 | Mott | 198/499 |
| 6,056,112 A | 5/2000 | Wiggins | |
| 6,203,737 B1 | 3/2001 | Zurbuchen | |
| 6,318,216 B1 | 11/2001 | Eggert et al. | |
| 6,443,294 B1 | 9/2002 | Brody et al. | |
| 2006/0049023 A1* | 3/2006 | Dietsch et al. | 198/499 |

* cited by examiner

*Primary Examiner*—Gene O. Crawford
*Assistant Examiner*—Ramya G Prakasam
(74) *Attorney, Agent, or Firm*—Wood, Phillips, Katz, Clark & Mortimer

(57) ABSTRACT

A tensioning system for a cleaning blade having a frame, a blade support, and a ratchet system. The blade support is movable around a first axis in a first direction to increase cleaning blade pressure and an opposite second direction. The ratchet system has (a) a first ratchet assembly with at least one ratchet surface facing in a first circumferential direction and (b) a second ratchet assembly having a first plurality of ratchet surfaces facing in a second circumferential direction. At least a part of one of the first and second ratchet assemblies is deformable to allow the blade support to pivot in the first direction to cause the one ratchet surface to (a) move past each of the ratchet surfaces of the blade support moves in the first direction and (b) abut one of the ratchet surfaces to block movement in the second direction.

42 Claims, 5 Drawing Sheets

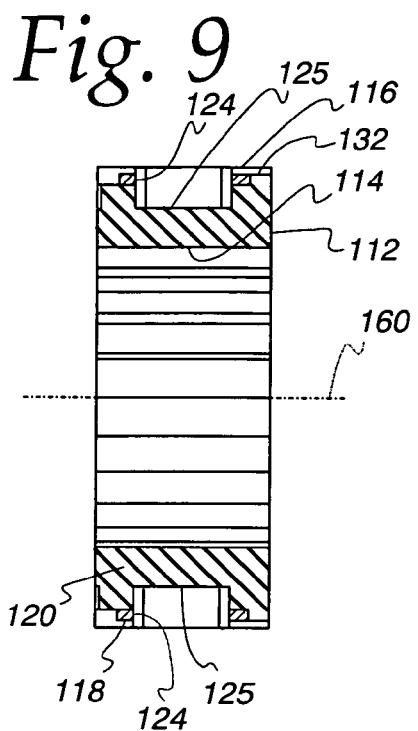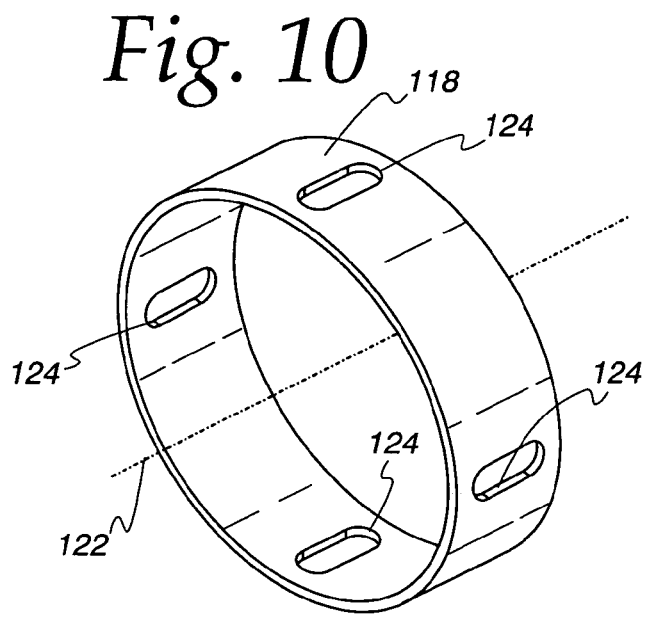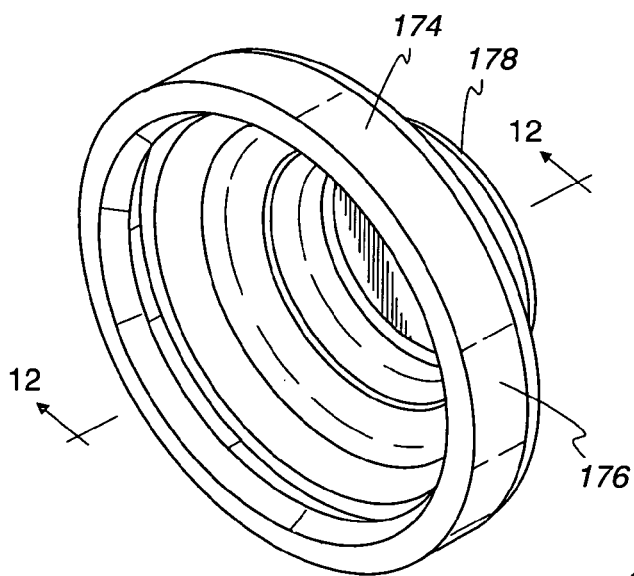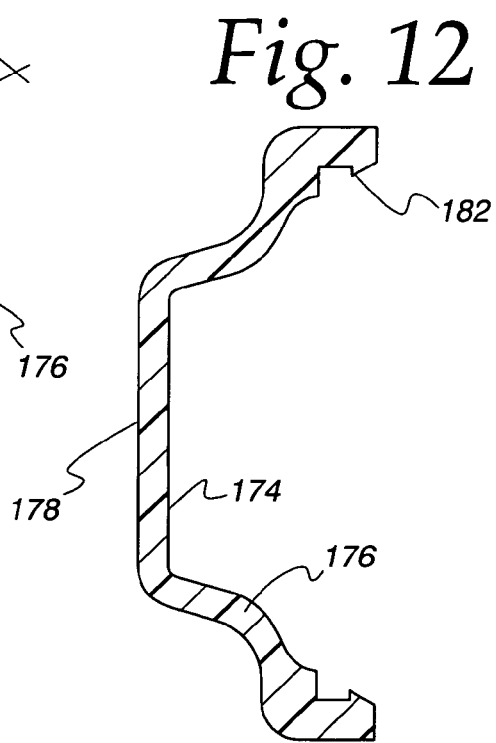

TENSIONING ASSEMBLY FOR CONVEYING BELT CLEANING BLADE

BACKGROUND OF THE INVENTION

1. Field of the Invention

This invention relates to blades, as used to clean conveying belts and, more particularly, to a tensioning assembly for urging the cleaning blade against a conveying belt.

2. Background Art

Endless belts are used in a wide range of environments to convey different articles and materials. Often particulate material is conveyed on belts between loading and discharge locations. At the discharge location, the material separates from the belt for collection, as for use or disposal, or for transportation to yet another location.

In certain environments, conveyed materials are, or become, wet so that they tend to adhere to the conveying belt surfaces. The material may be deposited on the conveying belt in a dampened state. Alternatively, dry material may become dampened by reason of being deposited on a conveying belt that has moisture thereon or by reason of the system's being operated in rainy and/or humid conditions. Over time, adhered materials tend to accumulate on the conveying belts. If these materials are not removed, the progressive accumulation may ultimately detrimentally affect the system operation.

The dampened material accumulated to any significant extent may add a significant amount of weight to the belts as they are continuously advanced in an endless path. This places an additional strain on the drive system, and support structure, for the conveying belts. The accumulation of significant quantities of foreign material may also produce an undesired deformation of the belts which may affect how they operate. In some environments, additional weight may cause deformation, or in a worse case failure, of the conveying belts, which may necessitate system adjustments and/or adjustments to, or replacements of, the conveying belts.

To mitigate the above problems, it is known to use cleaning blades at different locations to scrape foreign matter from the advancing belts. These conveying belts vary widely in terms of construction and size. A single blade may be used to span the full width of a conveying belt. Alternatively, a plurality of cleaning blades may be used across the width of the belt, and may be staggered lengthwise to redundantly engage a part of the width of the belt.

The cleaning blades are designed to perform optimally when borne against belt surfaces with a specific pressure. As the conveying systems are operated, there is a progressive wearing away of the surfaces of the cleaning blades that contact the belts. Thus, to maintain optimal pressure by the blades on the conveying belts, it may become necessary to periodically adjust the system that urges the blades against the belts.

Various systems have been devised to bias the cleaning blades against the conveying belts. A common design for such tensioners utilizes a torsion loading mechanism that produces the required blade bias. An exemplary system is shown in U.S. Pat. No. 6,056,112. These systems typically incorporate a fixed frame relative to which an assembly is turned around an axis to develop the blade bias. Once the desired bias is generated, it is known to install a pin, or the like, to fix the assembly relative to the frame. Different openings register to receive the pins with different blade biases set.

While these systems perform effectively, they inherently have some associated inconveniences. The operator must turn the assembly to produce the bias as through a tool, such as a wrench. If the system adjustments are carried out by a single individual, the individual must effect the turning and insert the pin with the desired blade pressure applied. As the wrench is turned, a progressively increasing resistance force is encountered. Continued turning causes a stored force to be generated that tends to release the pressure on the blade. If care is not taken, this restoring force may cause the turning tool to be moved in a manner that might cause it to detrimentally contact the operator. Inherently, the maintenance of a force on the blade and the insertion of a pin, or the like, is awkward for a single individual. Several adjustments may have to be made through a trial and error process to ultimately effect the appropriate adjustment.

It is also known to use ratchet arrangements to facilitate loading of a blade against a conveying belt and potentially eliminates the above problem. Typically, these ratchet systems are made with metal components. In many environments, the tensioning systems will be exposed to moisture and chemicals that may cause rust and corrosion. This may impair the operation of the tensioning systems, potentially necessitating repair and, in a worst case, replacement. This could lead to expensive down time in certain systems, particularly those in which long, continuous, conveying expanses are utilized in which the entire line must be shut down to effect maintenance of the tensioning system on any portion thereof.

SUMMARY OF THE INVENTION

In one form, the invention is directed to a tensioning system for a cleaning blade for a conveying belt. The tensioning system has a frame, a blade support, and a ratchet system. The blade support is movable around a first axis in a first direction to increase cleaning blade pressure and a second direction oppositely to the first direction to decrease cleaning blade pressure. Through the ratchet system, a position of the blade support can be maintained against pivoting in the second direction. The ratchet system has (a) a first ratchet assembly on one of the frame and blade support with at least one ratchet surface facing in a first circumferential direction relative to the first axis and (b) a second ratchet assembly on the other of the frame and blade support and having a first plurality of ratchet surfaces facing in a second circumferential direction oppositely to the first circumferential direction. At least a part of at least one of the first and second ratchet assemblies is deformable to allow the blade support to pivot in the first direction to cause the one ratchet surface to a) move circumferentially up to and sequentially past each of the ratchet surfaces in the first plurality of ratchet surfaces as an incident of the blade support moving in the first direction around the first axis and b) abut one of the ratchet surfaces in the first plurality of ratchet surfaces to block movement of the blade support in the second direction around the first axis.

In one form, at least one of (a) the at least one ratchet surface and (b) the ratchet surfaces in the first plurality of ratchet surfaces is defined by a non-metal material.

In one form, the at least one ratchet surface is defined by a tooth that projects radially relative to the first axis.

The ratchet surfaces in the first plurality of ratchet surfaces may each be defined by a tooth projecting radially relative to the first axis.

In one form, the teeth have a saw-toothed shape.

The tensioning system may further include a torsion assembly that is operable to move the blade support around the first axis in the first direction.

In one form, the torsion assembly has a torsion member that is movable around the first axis in the first direction to cause the blade support to move in the first direction around the first axis. At least a part of the first ratchet assembly follows movement of the torsion member in the first direction around the first axis.

The at least part of the first ratchet assembly may include a first plurality of teeth that project radially outwardly relative to the first axis, with each defining a ratchet surface facing in the first circumferential direction. The ratchet surfaces on the first plurality of teeth cooperate with the first plurality of ratchet surfaces to block movement of the blade support in the second direction around the first axis.

The first plurality of ratchet surfaces may be defined by a second plurality of teeth projecting radially inwardly towards the first axis.

In one form, the second ratchet assembly includes an annular body with a radially inwardly facing surface and a radially outwardly facing surface. The second plurality of teeth are at the radially inwardly facing surface. At least part of the first ratchet assembly is telescopingly engaged with the annular body so that the teeth in the first and second plurality of teeth are in mesh.

The frame may include a housing bounding a chamber within which the annular body and the at least part of the first ratchet assembly reside.

The tensioning system may further include a removable cover that is securable relative to the housing to bound the chamber.

The annular body may be securable to the housing to fix the annular body against movement relative to the housing around the first axis.

In one form, a fastener is extendable through the housing into the annular body.

The annular body and housing may be selectively fixed in a plurality of different angular positions around the first axis.

In one form, the teeth in at least one of the first and second plurality of teeth are defined by a urethane material.

In one form, the annular body is defined by a molded, non-metal material.

In one form, the teeth in one of the first and second plurality of teeth are arranged in first and second circumferentially spaced groups of teeth, and there is a circumferential gap between the first and second groups of teeth to allow the first and second groups of teeth to flex circumferentially towards each other.

In one form, the torsion member has a fitting with a polygonally-shaped external surface to be engaged by a turning tool to facilitate movement of the torsion member around the first axis.

The tensioning system may be provided in combination with a cleaning blade that is operatively mounted to the blade support.

The combination may further include a conveying system having a conveying belt with a conveying surface. The cleaning blade has a cleaning edge which is one of (a) adjacent to and (b) against the conveying surface.

In one form, teeth in at least one of the first and second plurality of teeth are deformable to allow the teeth in the first and second plurality of teeth to be moved against and past each other as the blade support is moved in the first direction around the first axis.

A sealing element may surround the torsion member to seal between the torsion member and the housing.

In one form, the sealing element bounds the chamber.

The sealing element and housing may be snap connected by relatively moving the sealing element and housing along the first axis.

A retaining element may be placed on the torsion member to block the part of the first ratchet assembly in the chamber.

The part of the first ratchet assembly may be made from a non-metal material.

In one form, the annular body has an insert that is molded into a non-metal material.

The insert may include a ring that is concentric with the first axis. An opening may be defined through the ring to receive the fastener.

In one form, the non-metal material is molded against an insert that is keyed to the torsion member against relative movement around the first axis.

In one form, there are teeth defining the ratchet surfaces on at least one of the first and second ratchet assemblies and a plurality of the teeth are deformable and deform to allow the blade support to pivot in the first direction around the first axis.

The invention is further directed to a tensioning system for a cleaning blade for a conveying belt having a frame, a blade support, and a ratchet system. The blade support is movable around a first axis in a first direction to increase cleaning blade pressure and a second direction oppositely to the first direction to decrease cleaning blade pressure. Through the ratchet system, a position of the blade support can be maintained against pivoting in the second direction. The ratchet system has (a) a first ratchet assembly on one of the frame and blade support with at least one ratchet surface facing in a first circumferential direction relative to the first axis and (b) a second ratchet assembly on the other of the frame and blade support and having a first plurality of ratchet surfaces facing in a second circumferential direction oppositely to the first circumferential direction. At least one of the ratchet surfaces on one of the first and second ratchet assemblies is defined by a first tooth that is deformable and deforms from a first state into a second state by movement against the other of the first and second ratchet assemblies to allow the blade support to pivot in the first direction, whereby the ratchet surface on the first tooth is thereby allowed to move circumferentially up to and past a first ratchet surface on the other of the first and second ratchet assemblies. As this occurs, the first tooth changes back towards its first state, such that the ratchet surface on the first tooth circumferentially confronts the first ratchet surface to prevent the blade support from moving in the second direction relative to the first axis.

The first tooth may be made from a non-metal material, such as urethane.

In one form, there are a plurality of teeth with circumferentially facing ratchet surfaces on the first ratchet assembly that cooperate with ratchet surfaces on a plurality of teeth with circumferentially facing ratchet surfaces on the second ratchet assembly.

The system may be provided in combination with a cleaning blade that is operatively mounted on the blade support.

The combination may further include a conveying system having a conveying belt with a conveying surface, with the cleaning blade having a cleaning edge that is one of (a) adjacent to and (b) against the conveying surface.

The invention is further directed to a tensioning system for a cleaning blade for a conveying belt having a frame, a blade support, and a ratchet system. The blade support is movable in a path in first and second opposite directions to respectively increase and decease cleaning blade pressure. Through the ratchet system, movement of the blade support in the second direction can be blocked. The ratchet system has (a) a first ratchet assembly on one of the frame and blade support with at least one ratchet surface facing in a first circumferential direction relative to a first axis and (b) a second ratchet assembly on the other of the frame and blade support and having a first plurality of ratchet surfaces facing in a second circumferential direction oppositely to the first circumferential direction. At least a part of at least one of the first and second ratchet assemblies is deformable to allow the one ratchet surface to move up to and sequentially past each of the ratchet surfaces in the first plurality of ratchet surfaces through movement of portions of the first and second ratchet assemblies relative to each other around the first axis, as an incident of which the blade support is caused to be moved in the path in the first direction.

In one form, at least one of the ratchet surfaces on one of the first and second ratchet assemblies is defined by a first tooth that is deformable and deforms from a first state into a second state to allow the blade support to move in the path in the first direction, whereby the ratchet surface on the first tooth is allowed to move circumferentially up to and past a first ratchet surface on the other of the first and second ratchet assemblies, whereupon the first tooth changes back towards its first state. As this occurs, the ratchet surface on the first tooth circumferentially confronts the first ratchet surface to prevent the blade support from moving in the second direction relative to the first axis.

The first tooth may be made from a non-metal material, such as urethane.

In one form, there are a plurality of teeth with circumferentially facing ratchet surfaces on the first ratchet assembly that cooperate with ratchet surfaces on a plurality of teeth with circumferentially facing ratchet surfaces on the second ratchet assembly.

The ratchet system may be provided in combination with a cleaning blade that is operatively mounted on the blade support.

The combination may further include a conveying system with a conveying belt with a conveying surface, with the cleaning blade having a cleaning edge that is one of (a) adjacent to and (b) against the conveying surface.

BRIEF DESCRIPTION OF THE DRAWINGS

FIG. 9 is an enlarged, cross-sectional view of the ratchet assembly taken along line 9-9 of FIG. 8;

FIG. 10 is an enlarged, perspective view of a reinforcing insert on the ratchet assembly in FIGS. 7-9;

FIG. 11 is an enlarged, perspective view of a cover for a chamber in which the ratchet assemblies on the tensioning system are operatively mounted; and FIG. 12 is an enlarged, cross-sectional view of the cover taken along lines 12-12 of FIG. 11.

DETAILED DESCRIPTION OF THE DRAWINGS

Figure 1:
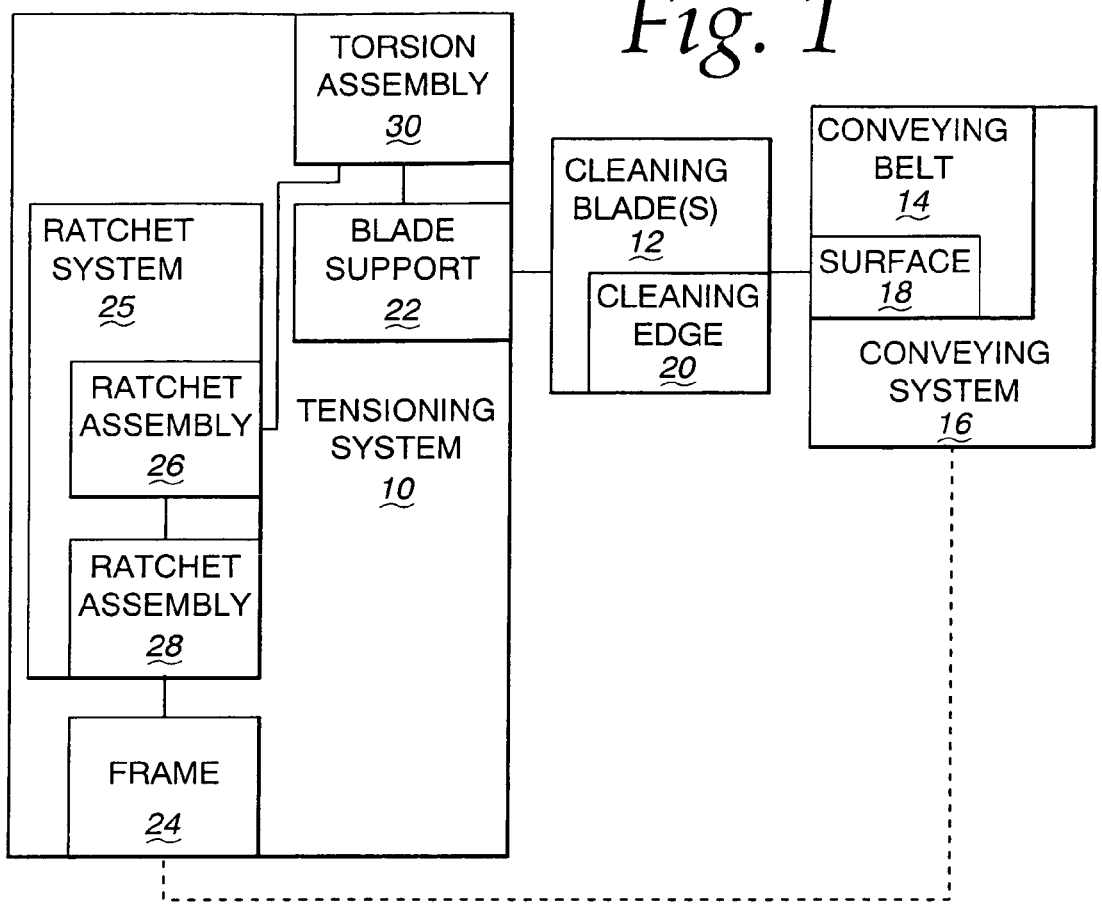
FIG. 1 is a schematic representation of a tensioning system, according to the present invention, for a cleaning blade for a conveying belt.
Figure 2:
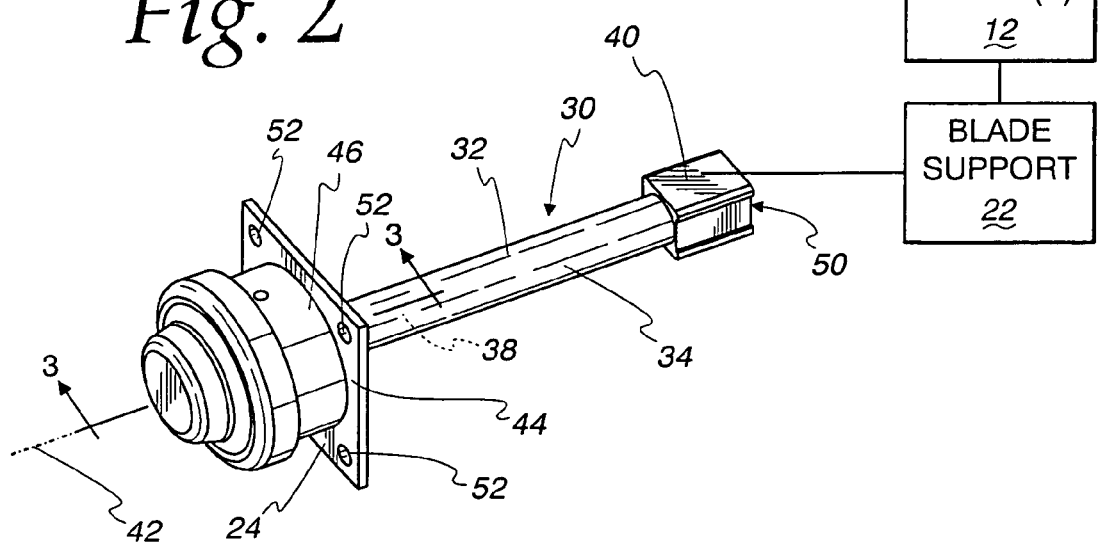
FIG. 2 is a partially schematic, perspective view of the inventive tensioning system including a cleaning blade thereon.
Figure 3:
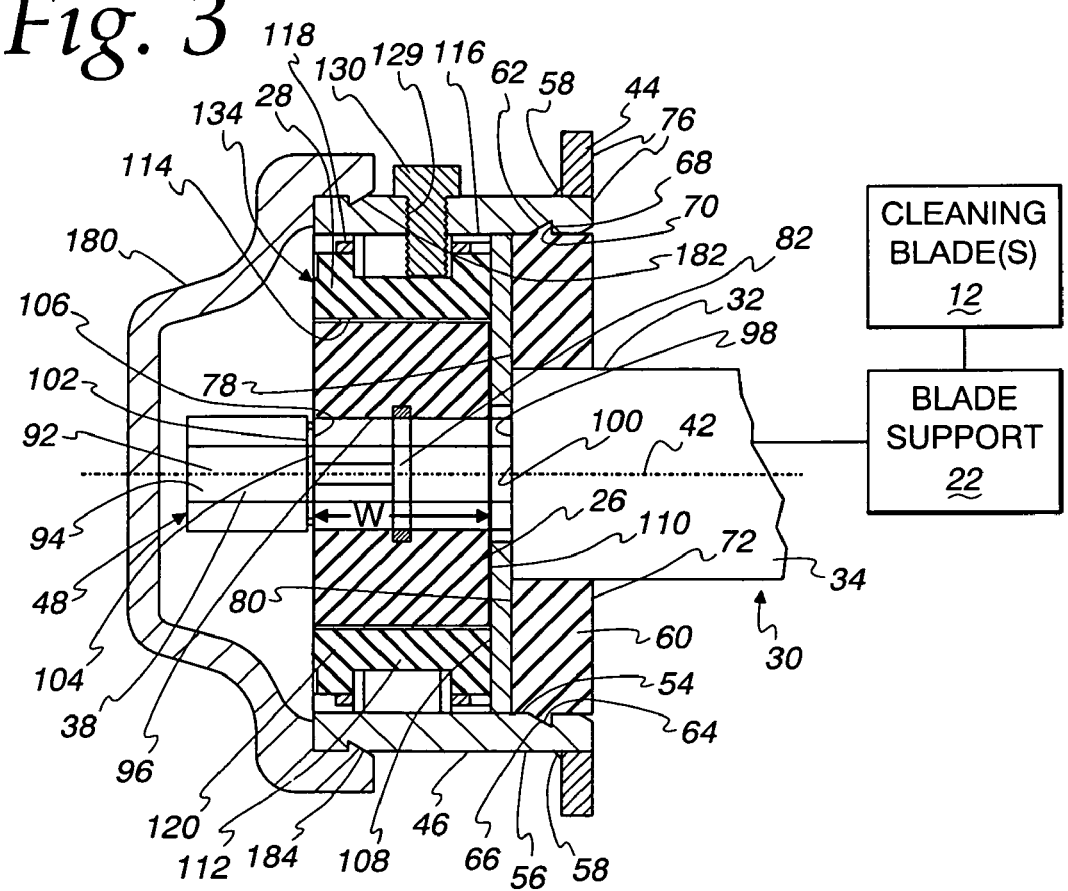
FIG. 3 is an enlarged, fragmentary, cross-sectional view of the tensioning system taken along line 3-3 of FIG. 2 and including a ratchet system with cooperating ratchet assemblies.
Figure 4:
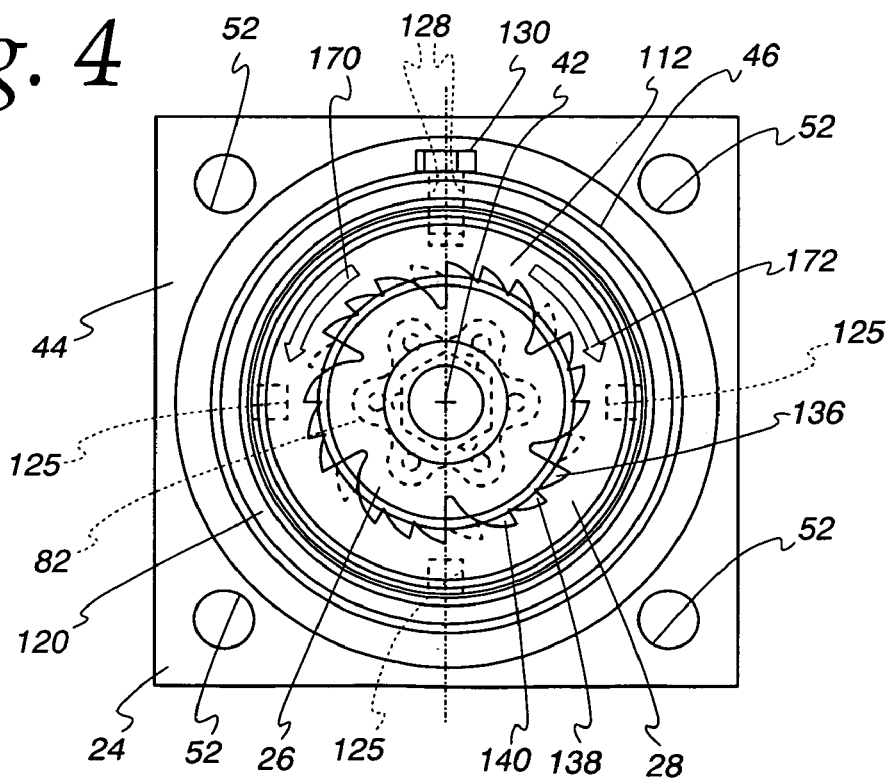
FIG. 4 is an enlarged, side elevation view of the tensioning system in FIG. 3, with a cover removed to expose the ratchet assemblies to view.
Figure 5:
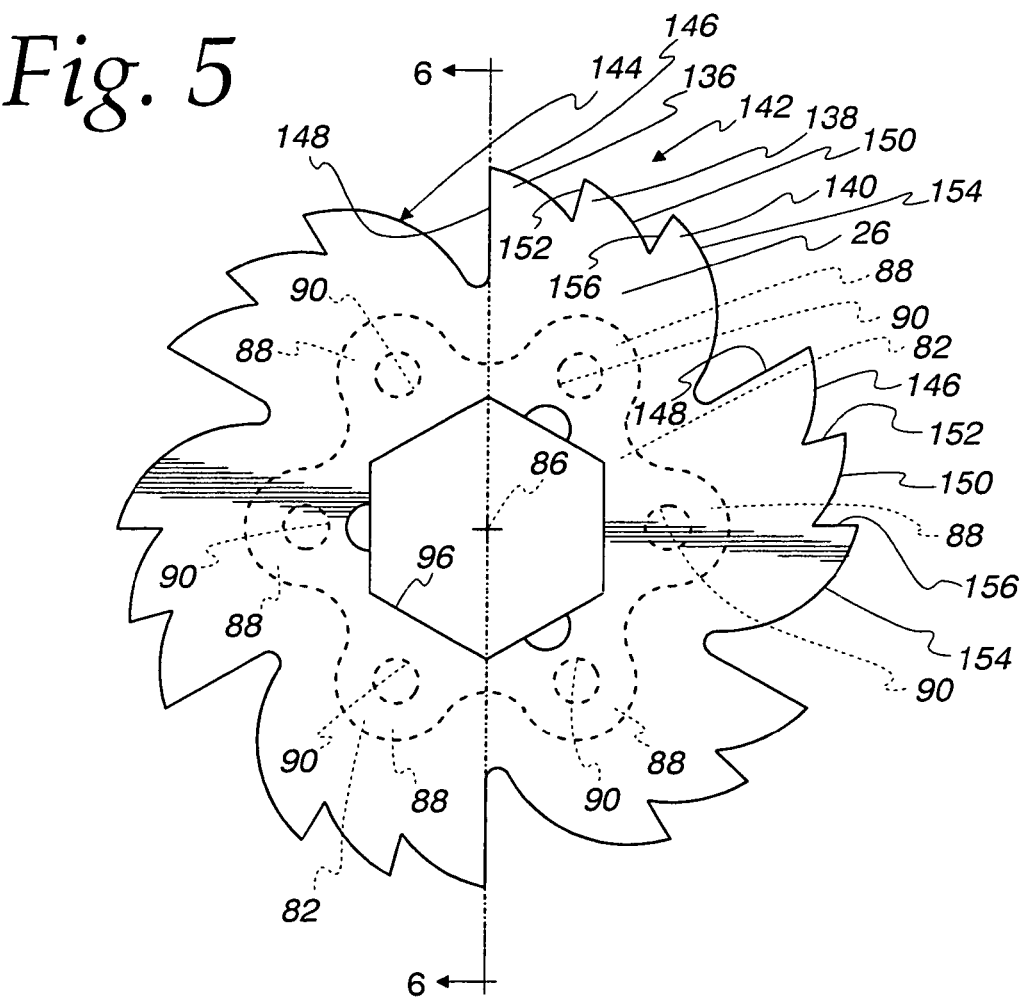
FIG. 5 is an enlarged, side elevation view of one of the ratchet assemblies on the ratchet system which is moved around an axis relative to the other ratchet assembly shown in FIGS. 3 and 4.
Figure 6:
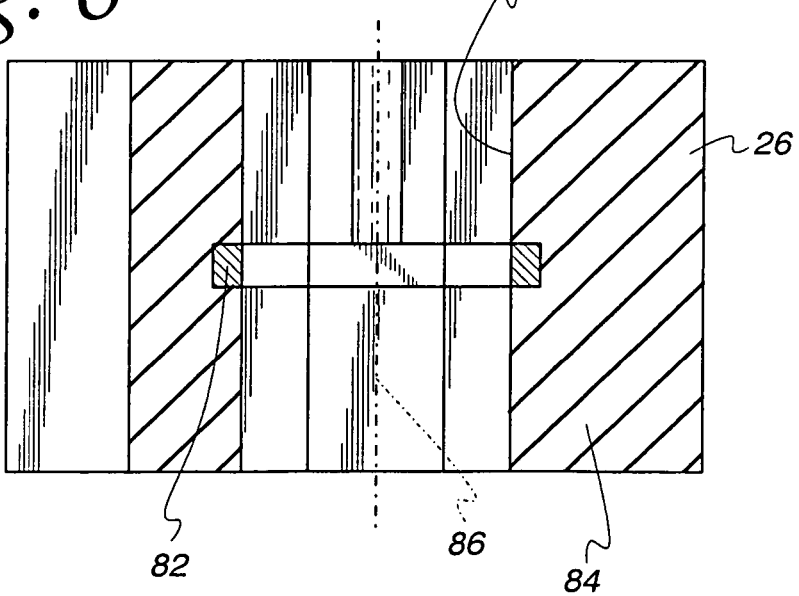
FIG. 6 is an enlarged, cross-sectional view of the ratchet assembly taken along line 6-6 of FIG. 5.
Figure 7:
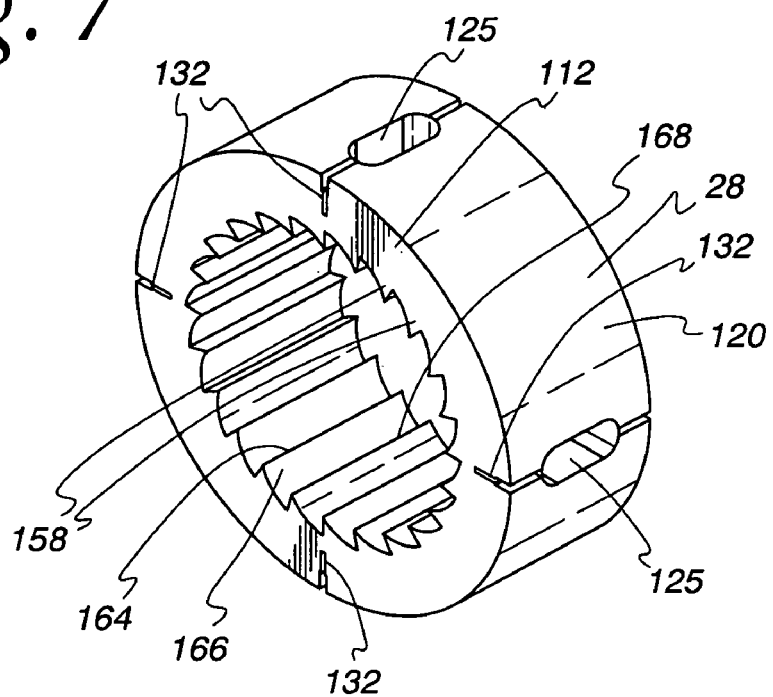
FIG. 7 is an enlarged, perspective view of the ratchet assembly that cooperates with the ratchet assembly shown in FIGS. 5 and 6.
Figure 8:
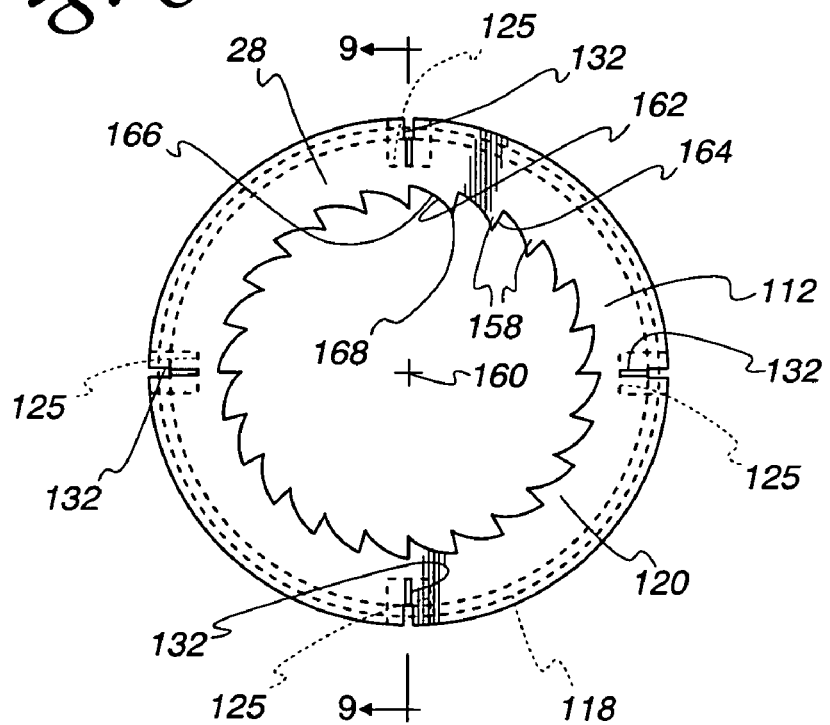
FIG. 8 is an enlarged, side elevation view of the ratchet assembly in FIG. 7.

Referring initially to FIG. 1, a tensioning system 10, according to the present invention, is shown for a cleaning blade 12 for a conveying belt 14 that is part of a conveying system 16. The conveying system 16 may take virtually a limitless number of different forms, for use in any environment in which individual objects, flowable material, particulate, etc. is/are conveyed on an upwardly facing surface 18 on the conveying belt 14 between first and second spaced locations.

Similarly, the nature of the cleaning blade 12 is not critical to the present invention. An exemplary blade configuration is shown in U.S. Pat. No. 6,056,112, which is incorporated herein by reference. The cleaning blade 12 has a cleaning edge 20 that is placed in close proximity to, or more preferably is biased against, the conveying belt surface 18 through the tensioning system 10.

The tensioning system 10 consists of a blade support 22 upon which the cleaning blade 12 is operatively mounted. The blade support 22 is mounted to a frame 24 that may be independent, or part of, the conveying system 16, with the latter relationship indicated by dotted lines. The blade support 22 is movable, in any of a number of different paths, in opposite directions to selectively increase and decrease cleaning blade pressure between the cleaning blade 12 on the blade support 22 and the conveying belt 14.

To prevent the blade support 22 from inadvertently repositioning so that the cleaning blade 12 is moved away from the conveying belt 14 and/or the cleaning blade pressure on the conveying belt 14 is diminished, a ratchet system 25 is utilized. The ratchet system 25 consists of ratchet assemblies 26,28, which cooperate with each other and between the blade support 22 and frame 24, to facilitate substantially single directional movement of the blade support 22 in its path relative to the frame 24 so as to direct the cleaning blade 12 on the blade support 22 towards the conveying belt 14 and/or increase pressure applied by the cleaning blade 12 to the conveying belt 14.

In this embodiment, a torsion assembly 30 acts between the ratchet assembly 26 and blade support 22. As seen in FIGS. 2-10, the torsion assembly 30 consists of a torsion member 32, having an elongate body 34 made of a deformable material within which a metal insert 38 is embedded. The torsion member 32 corresponds to that shown in U.S. Pat. No. 6,056,112 and cooperates with the blade support 22 as described for the blade support in U.S. Pat. No. 6,056,112. Briefly, the torsion member 32 is keyed to the blade support 22 through a polygonally-shaped enlargement 40 in such a manner that, as the torsion member 32 is moved around its central axis 42, the blade support 22 follows that movement, i.e., moves likewise around the axis 42.

The frame 24 includes a mounting plate 44 and housing 46 which are mounted to the frame 24 and/or the conveying system 16 to support the proximal end 48 of the torsion member 32, which is axially opposite to the distal end 50 of the torsion member 32 on which the polygonally-shaped enlargement 40 is provided. The housing 46 is fixed to the mounting plate 44. The mounting plate 44 has a series of through openings 52, in this case four in number, to accept fasteners (not shown) through which the mounting plate 44 is secured to the frame 24, or other suitable structure.

The housing 46 has an annular shape with a radially inwardly facing surface 54 and a radially outwardly facing surface 56. The mounting plate 44 surrounds the radially outwardly facing surface 56 and is secured thereto as by one or more welds 58. A sealing element 60 surrounds the torsion member 32 and seals between the torsion member 32 and the radially inwardly facing surface 54 of the housing 46. The sealing element 60 is snap-fit to the housing 46 through a radially outwardly projecting rib 62 on the sealing element 60, which seats in a complementary receptacle 64 on the housing. The rib 62 has a ramp surface 66 which increases in diameter progressively in an axial direction, from left-to-right in FIG. 3, and terminates at an axially facing shoulder. By advancing the sealing element 60 from right-to-left in FIG. 3 relative to the housing 46, the rib 62 is caused by the housing surface 54 to be deformed radially inwardly until the rib 62 coincides with the receptacle 64, at which point the rib 62 tends back towards an undeformed state wherein the shoulder 68 on the rib 62 abuts to an axially oppositely facing shoulder 70 bounding the receptacle 64 on the housing 46. Once the sealing element 60 is snap-connected to the housing 46, an axially facing surface 72 on the sealing element 60 becomes flush with surfaces 74,76, respectively on the housing 46 and mounting plate 44. An axially facing surface 78 on the sealing element 60, facing oppositely to the surface 72, bounds, in conjunction with the housing surface 54, a chamber 80 within which the ratchet assemblies 26,28 reside.

The ratchet assembly 26 consists of a generally flat insert 82 around which a body 84 is molded. The ratchet assembly 26 has a central axis 86 which coincides with the axis 42. The insert 82 has a series of projections 88, in this case six in number, directed radially outwardly from the axis 86 and spaced equidistantly therearound. Openings 90 are provided through each projection 88 to accept the material that is molded to produce the body 84 to enhance the connection between the insert 82 and the molded material defining the body 84.

The insert 38 on the torsion member 32 has a polygonally-shaped outer surface 92 which, in this embodiment, is in the shape of a hexagon. The outer surface 92 keys the insert 38 to the elongate body 34 so that the elongate body 34 and insert 38 move as one piece around the axis 42. An end fitting 94 is defined by the insert 38 at the proximal end 48 of the torsion member 32 to facilitate engagement by a conventional wrench, through which the insert 38 can be engaged and moved, with a substantial torque, around the axis 42.

The ratchet assembly 26 has a bore 96 therethrough and through the insert 82. The insert 38 is keyed within the through bore 96 preferably by making the cross-sectional shape of the through bore 96, over its entire axial extent, complementary to the hexagonal outer surface 92. With this arrangement, the ratchet assembly 26 can be slid over the end fitting 94 and moved axially towards an annular shoulder 98 that is defined at the axial end 100 of the elongate body 34, which has a larger diameter than the insert 38. The shoulder 98 thus confines axial movement of the ratchet assembly 26 from left-to-right relative to the torsion member 32 in FIG. 3.

A retaining ring 102 is snap-fit into a slot 104 through the outer surface 92 of the insert 38 and defines a shoulder 106, facing the shoulder 98. Through this arrangement, the ratchet assembly 26 is confined against axial movement within the chamber 80 between the shoulders 98,106. In this embodiment, a washer 108 is interposed between the shoulder 98 and one axially facing surface 110 on the ratchet assembly 26. The washer 108 spans the full diameter of the chamber 80 and is abuttable to the surface 78 on the sealing element 60 and shoulder 98, which are flushly axially aligned.

The ratchet assembly 28 is telescopingly engaged with the ratchet assembly 26 within the chamber 80, with the ratchet assembly 28 radially outside of the ratchet assembly 26. The ratchet assembly 28 consists of an annular body 112 having a radially inwardly facing surface 114 and a radially outwardly facing surface 116. The annular body 112 consists of a ring-shaped reinforcing insert 118 about which a moldable material 120 is formed. The ring-shaped insert 118 has a central axis 122 which is concentric with the axis 42. The insert 118 has four radially extending, oval through openings 124 aligned one each with correspondingly-shaped, blind openings 125 in the moldable material 120 on the annular body 112.

With the ratchet assemblies 126,128 operatively engaged, one of the registered pairs of openings 124,125 is aligned with a threaded bore 128 extending radially through the housing 46. A threaded fastener 130 is turned to be directed into the registered openings 124,125. Any one of the four pairs of openings 124,125 can be aligned to accept the fastener 130. Slots 132, contiguous with the openings 124,125 are provided and are visible so as to facilitate angular alignment of the ratchet assembly 28 from the axial side 134 of the ratchet assembly 28.

The ratchet assembly 26 has a plurality of radially outwardly facing teeth 136,138,140, arranged in groups at 142. A circumferential gap 144 is defined between adjacent groups 142 to allow flexing of the groups 142 in a circumferential direction. The tooth 136 has a convexly curved surface 146 which terminates at a ratchet surface 148 facing in a first circumferential direction. The tooth 138 has a like curved surface 150 terminating at a ratchet surface 152 facing in the same first circumferential direction. The tooth 140 also has a curved surface 154 which terminates at a ratchet surface 156 facing in the first circumferential direction. The teeth 136, 138,140 in each group 142 have a generally saw tooth-shaped arrangement, with the groups 142 spaced at regular intervals around the axis 86.

The ratchet assembly 28 has a plurality of teeth 158 projecting radially inwardly relative to the axis 42 and spaced at regular intervals around a central axis 160 for the annular body 112. Each tooth 158 has a curved, concave surface 162 which terminates at a ratchet surface 164 that faces circumferentially oppositely to the ratchet surfaces 148,152,156 on the teeth 136,138,140, respectively. The teeth 158 on the ratchet assembly 28 are configured so that the teeth 136,138, 140 on the ratchet assembly 26 can nest, one each, in a radially outwardly extending receptacle 166 bounded by the surface 162 on one tooth 158 and the ratchet surface 164 on the next tooth 158 adjacent thereto in a circumferential direction. The surfaces 162,164 on each tooth 158 meet at an apex 168.

The teeth 136,138,140,158 are dimensioned and circumferentially arranged so that the ratchet assemblies 26,28 can be telescopingly engaged to be placed in their operative position wherein they axially coincide over a corresponding axial width W with the teeth 136, 138, 140, 158 in mesh. The teeth 136,138,140 are received, one each, in a receptacle 166. The teeth 136,138,140, in an undeformed state, substantially fill the receptacles 166 with which the teeth 136,138,140 align. In this state, the ratchet surfaces 148,152,156 on the teeth 136, 138,140 on the ratchet assembly 26 confront the ratchet surfaces 164 on the ratchet assembly 28 to prohibit rotational movement of the ratchet assembly 26 around the axis 42 in the direction indicated by the arrow 170 in FIG. 4. Movement of the ratchet assembly 26 in the direction of the arrow 170 causes the torsion assembly 30 to move similarly around the axis 42 in a manner that causes the support assembly to be repositioned to either reduce the pressure applied by the cleaning blade 12 to the conveying belt 14 or to fully separate the cleaning blade 12 from the conveying belt 14. Movement of the ratchet assembly 26 in this manner is accomplished by releasing the fastener 130 to allow the keyed ratchet assemblies 26, 28 to rotate together in the direction of the arrow 170 around the axis 42. Movement of the ratchet assembly 126 in the opposite direction, as indicated by the arrow 172, causes the blade support 22 to moved in a manner that moves the cleaning blade 12 towards, or with increasing pressure against, the conveying belt 14.

Movement of the ratchet assembly 26, in the direction of the arrow 172 relative to the ratchet assembly 28, is permitted by making the teeth 136,138,140 and/or teeth 158 deformable. Preferably, at least the teeth 136,138,140 are deformable so that as the ratchet assembly 26 moves in the direction of the arrow 172 around the axis 142, the teeth 136,138,140 compress radially inwardly, by reason of the pressure applied thereto through the teeth 158, to a deformed state. The deformation is sufficient that the deformed teeth 136,138,140 can pass over the apices 168 on the teeth 158 to align with the next adjacent receptacle 166, whereupon the teeth 136,138,140 change back to an undeformed state to seat in the receptacles 166, as previously described. The convex tooth surfaces 146, 150, 154 facilitate passage of the teeth 158 thereover without hangup. The teeth 158 may deform radially outwardly to facilitate passage of the compressed teeth 136,138,140 in transition between adjacent turned positions for the ratchet assembly 26.

With the arrangement shown, the ratchet assembly 26 can be incrementally turned in the direction of the arrow 172 with reverse movement, as indicated by the arrow 170, prohibited by the cooperating ratchet surfaces 148,152,156,164. The angular increment is equal to 360° divided by the number of receptacles 166. It should be understood, however, that the inventive concept can be practiced with but a single tooth with a ratchet surface facing in one direction on one of the ratchet assembles 26,28, and a single ratchet surface on the other of the ratchet assemblies 26,28, facing oppositely to the one direction. With this arrangement, the ratchet assembly 26 would be rotatable through approximately a 360° range around the axis 42 before the ratchet surfaces engage. However, by having the arrangement shown, a stepwise, gradual torque increase can be effected to the desired cumulative torque value.

The ratchet assemblies 26,28 can be molded from a non-metal material. As one example, the molded material, within which the insert 82 is embedded in the ratchet assembly 26, may be a 0.77 pound urethane material. The insert 82 may be made from metal, which positively transmits torque from the torsion member 32 to and through the urethane material defining the teeth 136,138,140. The molded material in which the ring-shaped insert 118 is embedded may be 0.98 pound urethane. The ring-shaped insert 118 may be made from metal. By reason of using urethane or other non-metal material, the ratchet assemblies 26,28 are not prone to rusting or corrosion upon being exposed to moisture and chemicals. The urethane material has a high compressive strength to maintain the integrity of the teeth 136,138,140,158 when the same are under load. At the same time, the teeth 136,138,140,158 may deform to produce the ratcheting action described above.

The chamber 80 can be closed or sealed by a removable cover 174, as seen in FIGS. 11 and 12. The cover 174 has a cup shape with a stepped diameter peripheral wall 176 extending away from a base wall 178. The peripheral wall 176 is shaped to provide a streamlined outer surface 180 while accommodating the end fitting 94 of the insert 38. Preferably, the cover 174 is designed to be snap-fit to the housing 46. A rib 182 on the cover 174, and a receptacle 184 on the housing 46, cooperate in the same manner as the corresponding rib 62 and receptacle 64 on the sealing element 60 and housing 46 to allow the cover 174 to be snap-connected to the housing 46 by effecting relative axial movement therebetween. The cover 174 is preferably designed to block the migration of dust into the chamber 80 as might cause a potentially detrimental accumulation on the teeth 136,138,140,158, such that the function of the ratchet system 25 is impaired.

While the invention has been described with particular reference to the drawings, it should be understood that various modifications could be made without departing from the spirit and scope of the present invention.

The invention claimed is:

1. A tensioning system for a cleaning blade for a conveying belt, the tensioning system comprising:
   a frame;
   a blade support that is movable around a first axis in a first direction to increase cleaning blade pressure and a second direction oppositely to the first direction to decrease cleaning blade pressure; and
   a ratchet system through which a position of the blade support can be maintained against movement in the second direction,
   the ratchet system comprising (a) a first ratchet assembly on one of the frame and blade support with at least one ratchet surface facing in a first circumferential direction relative to the first axis and (b) a second ratchet assembly on the other of the frame and blade support and comprising a first plurality of ratchet surfaces facing in a second circumferential direction oppositely to the first circumferential direction,
   at least one of (a) the at least one ratchet surface and (b) the ratchet surfaces in the first plurality of ratchet surfaces is defined by a non-metal material that deforms radially relative to the first axis as the blade support pivots in the first direction to allow the one ratchet surface to i) move circumferentially up to and sequentially past each of the ratchet surfaces in the first plurality of ratchet surfaces as an incident of the blade support moving in the first direction around the first axis and ii) abut one of the ratchet surfaces in the first plurality of ratchet surfaces to block movement of the blade support in the second direction around the first axis.

2. The tensioning system for a cleaning blade for a conveying belt according to claim 1 wherein the at least one ratchet surface is defined by a tooth that projects radially relative to the first axis.

3. The tensioning system for a cleaning blade for a conveying belt according to claim 2 wherein the ratchet surfaces in the first plurality of ratchet surfaces are each defined by a tooth projecting radially relative to the first axis.

4. The tensioning system for a cleaning blade for a conveying belt according to claim 3 wherein the teeth have a saw-toothed shape.

5. The tensioning system for a cleaning blade for a conveying belt according to claim 1 further comprising a torsion assembly that is operable to move the blade support around the first axis in the first direction.

6. The tensioning system for a cleaning blade for a conveying belt according to claim 5 wherein the torsion assembly comprises a torsion member that is movable around the first axis in the first direction to cause the blade support to move in the first direction around the first axis, and at least a part of the first ratchet assembly follows movement of the torsion member in the first direction around the first axis.

7. The tensioning system for a cleaning blade for a conveying belt according to claim 6 wherein the at least part of the first ratchet assembly comprises a first plurality of teeth that project radially outwardly relative to the first axis and each defines a ratchet surface facing in the first circumferential direction, the ratchet surfaces on the first plurality of teeth cooperating with the first plurality of ratchet surfaces to block movement of the blade support in the second direction around the first axis.

8. The tensioning system for a cleaning blade for a conveying belt according to claim 7 wherein the first plurality of ratchet surfaces are defined by a second plurality of teeth projecting radially inwardly towards the first axis and at least one of: a) teeth in the first plurality of teeth; and b) teeth in the second plurality of teeth are deformable radially relative to the first axis to allow the blade support to pivot in the first direction and the one ratchet surface to move circumferentially up to and sequentially past the ratchet surfaces in the first plurality of ratchet surfaces.

9. The tensioning system for a cleaning blade for a conveying belt according to claim 8 wherein the second ratchet assembly comprises an annular body having a radially inwardly facing surface and a radially outwardly facing surface, the second plurality of teeth are at the radially inwardly facing surface, and the at least part of the first ratchet assembly is telescopingly engaged with the annular body so that a plurality of the teeth in each of the first and second plurality of teeth are in mesh.

10. The tensioning system for a cleaning blade for a conveying belt according to claim 9 wherein the frame comprises a housing bounding a chamber within which the annular body and the at least part of the first ratchet assembly reside.

11. The tensioning system for a cleaning blade for a conveying belt according to claim 10 further comprising a removable cover that is securable relative to the housing to bound the chamber.

12. The tensioning system for a cleaning blade for a conveying belt according to claim 10 wherein the annular body is securable to the housing to fix the annular body against movement relative to the housing around the first axis.

13. The tensioning system for a cleaning blade for a conveying belt according to claim 12 wherein a fastener is extendable through the housing into the annular body.

14. The tensioning system for a cleaning blade for a conveying belt according to claim 12 wherein the annular body and housing can be selectively fixed in a plurality of different relative angular positions around the first axis.

15. The tensioning system for a cleaning blade for a conveying belt according to claim 9 wherein the teeth in at least one of the first and second plurality of teeth are defined by a urethane material.

16. The tensioning system for a cleaning blade for a conveying belt according to claim 9 wherein the annular body comprises a molded non-metal material.

17. The tensioning system for a cleaning blade for a conveying belt according to claim 9 wherein the teeth in one of the first and second plurality of teeth are arranged in first and second circumferentially spaced groups of teeth and there is a circumferential gap between the first and second groups of teeth to allow the first and second groups of teeth to flex circumferentially towards each other.

18. The tensioning system for a cleaning blade for a conveying belt according to claim 6 wherein the part of the first ratchet assembly is molded from a non-metal material.

19. The tensioning system for a cleaning blade for a conveying belt according to claim 18 wherein the torsion member has a fitting with a polygonally-shaped external surface to be engaged by a turning tool to facilitate movement of the torsion member around the first axis.

20. The tensioning system for a cleaning blade for a conveying belt according to claim 1 in combination with a cleaning blade that is operatively mounted on the blade support.

21. The tensioning system for a cleaning blade for a conveying belt according to claim 20 further in combination with a conveying system comprising a conveying belt with a conveying surface and the cleaning blade has a cleaning edge which is one of (a) adjacent to and (b) against the conveying surface.

22. The tensioning system for a cleaning blade for a conveying belt according to claim 8 wherein teeth in [at least ]one of the first and second plurality of teeth are deformable radially inwardly to allow the teeth in the first and second plurality of teeth to be moved against and past each other as the blade support is moved in the first direction around the first axis.

23. The tensioning system for a cleaning blade for a conveying belt according to claim 10 wherein a sealing element surrounds the torsion member and seals between the torsion member and the housing.

24. The tensioning system for a cleaning blade for a conveying belt according to claim 23 wherein the sealing element bounds the chamber.

25. The tensioning system for a cleaning blade for conveying Belt according to claim 23 wherein the sealing element and housing are snap connected by relatively moving the sealing element and housing along the first axis.

26. The tensioning system for a cleaning blade for a conveying belt according to claim 10 wherein a retaining element is placed on the torsion member to block the part of the first ratchet assembly in the chamber.

27. The tensioning system for a cleaning blade for a conveying belt according to claim 13 wherein the annular body comprises an insert that is molded into a non-metal material.

28. The tensioning system for a cleaning blade for a conveying belt according to claim 27 wherein the insert comprises a ring that is concentric with the first axis and an opening is defined through the ring to receive the fastener.

29. The tensioning system for a cleaning blade for a conveying belt according to claim 18 wherein the non-metal material is molded against an insert that is keyed to the torsion member against relative movement around the first axis.

30. The tensioning system for a cleaning blade for a conveying belt according to claim 1 wherein there are teeth defining the ratchet surfaces on at least one of the first and second ratchet assemblies and a plurality of the teeth are deformable and deform to allow the blade support to pivot in the first direction around the first axis.

31. A tensioning system for a cleaning blade for a conveyor belt, the tensioning system comprising:
a frame;
a blade support that is movable around a first axis in a first direction to increase cleaning blade pressure and a second direction oppositely to the first direction to decrease cleaning blade pressure, and
a ratchet system through which a position of the blade support can be maintained against pivoting in the second direction,
the ratchet system comprising (a) a first ratchet assembly on one of the frame and blade support with at least one ratchet surface facing in a first circumferential direction relative to the first axis and (b) a second ratchet assembly on the other of the frame and blade support and comprising a first plurality of ratchet surfaces facing in a second circumferential direction oppositely to the first circumferential direction, wherein at least one of the ratchet surfaces on one of the first and second ratchet assemblies is defined by a first tooth that deforms from a first state into a second state as the blade support pivots in the first direction, whereby the ratchet surface on the first tooth is thereby allowed to move circumferentially up to and past a first ratchet surface on the other of the first and second ratchet assemblies, whereupon the first tooth changes back towards its first state such that the ratchet surface on the first tooth circumferentially confronts the first ratchet surface to prevent the blade support from moving in the second direction relative to the first axis.

32. The tensioning system for a cleaning blade for a conveying belt according to claim 31 wherein the first tooth comprises a nonmetal metal material that allows the first tooth to deform radially relative to the first axis between the first and second states.

33. The tensioning system for a cleaning blade for a conveying belt according to claim 32 wherein the first tooth comprises urethane.

34. The tensioning system for a cleaning blade for a conveying belt according to claim 31 wherein there are a plurality of teeth with circumferentially facing ratchet surfaces on the first ratchet assembly that cooperate with ratchet surfaces on a plurality of teeth with circumferentially facing ratchet surfaces on the second ratchet assembly.

35. The tensioning system for a cleaning blade for a conveying belt according to claim 31 further in combination with a cleaning blade that is operatively mounted on the blade support.

36. The tensioning system for a cleaning blade for a conveying belt according to claim 35 further in combination with a conveying system comprising a conveying belt with a conveying surface and the cleaning blade has a cleaning edge that is one of (a) adjacent to and (b) against the conveying surface.

37. A tensioning system for a cleaning blade for a conveying belt, the tensioning system comprising:
a frame;
a blade support that is movable in a path in first and second opposite directions to respectively increase and decease cleaning blade pressure; and
a ratchet system through which movement of the blade support in the second direction can be blocked,
the ratchet system comprising (a) a first ratchet assembly on one of the frame and blade support with a first plurality of ratchet surfaces facing in a first circumferential direction relative to a first axis and (b) a second ratchet assembly on the other of the frame and blade support and comprising a second plurality of ratchet surfaces facing in a second circumferential direction oppositely to the first circumferential direction, wherein at least one of the ratchet surfaces on one of the first and second ratchet assemblies is defined by a first tooth that is deformable and deforms from a first state into a second state as the first plurality of ratchet surfaces move up to and sequentially past each of the ratchet surfaces in the second plurality of ratchet surfaces as the first and second ratchet assemblies move relative to each other around the first axis as an incident of which the blade support is caused to be moved in the path in the first direction, whereupon the ratchet surface on the first tooth moves circumferentially up to and past a first ratchet surface on the other of the first and second ratchet assemblies whereupon the first tooth changes back towards its first state such that the ratchet surface on the first tooth circumferentially confronts the first ratchet surface to prevent the blade support from moving in the second direction relative to the first axis.

38. The tensioning system for a cleaning blade for a conveying belt according to claim 37 wherein the first tooth comprises a non-metal material.

39. The tensioning system for a cleaning blade for a conveying belt according to claim 38 wherein the first tooth comprises urethane.

40. The tensioning system for a cleaning blade for a conveying belt according to claim 37 wherein there are a plurality of teeth with circumferentially facing ratchet surfaces on the first ratchet assembly that cooperate with ratchet surfaces on a plurality of teeth with circumferentially facing ratchet surfaces on the second ratchet assembly.

41. The tensioning system for a cleaning blade for a conveying belt according to claim 37 in combination with a cleaning blade that is operatively mounted on the blade support.

42. The tensioning system for a cleaning blade for a conveying belt according to claim 41 further in combination with a conveying system comprising a conveying belt with a conveying surface and the cleaning blade has a cleaning edge which is one of (a) adjacent to and (b) against the conveying surface.

* * * * *